Jan. 4, 1938. J. KALES 2,104,259
GENERATOR AND/OR STARTING MOTOR FOR MOTOR VEHICLES
Filed April 10, 1936
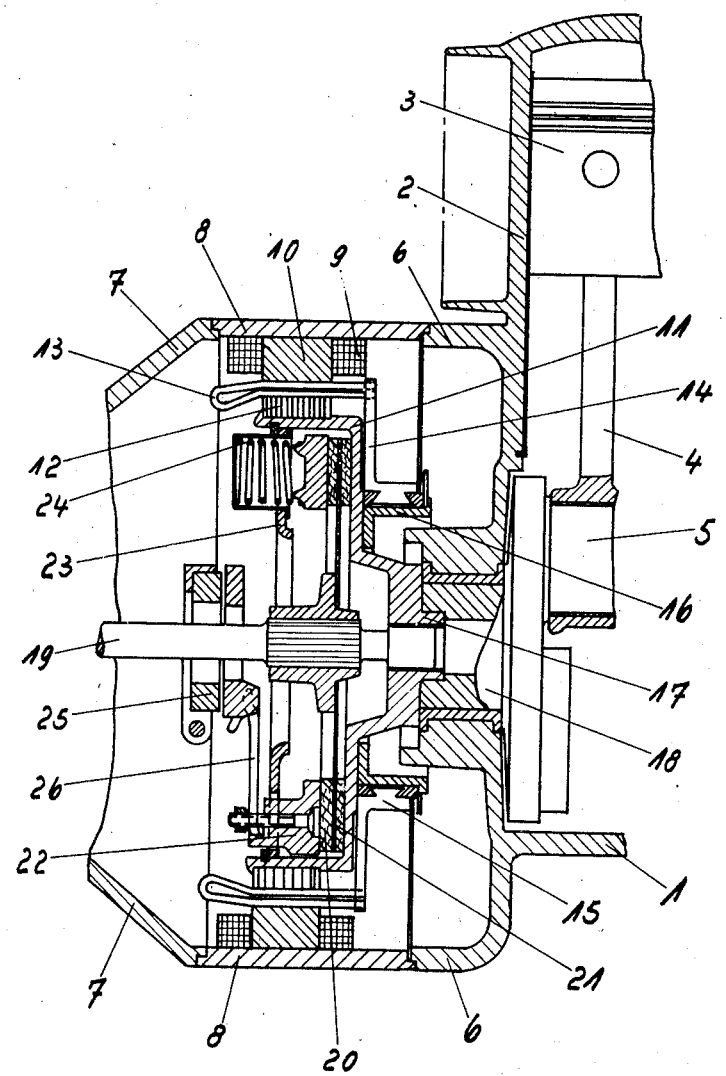
Josef Kales
Inventor
by A. A. Wicks
Attorney Patented Jan. 4, 1938

2,104,259

UNITED STATES PATENT OFFICE 2,104,259

GENERATOR AND/OR STARTING MOTOR FOR MOTOR VEHICLES

Josef Kales, Stuttgart, Germany

Application April 10, 1936, Serial No. 73,618
In Germany December 21, 1934

2 Claims. (Cl. 290—1)

The invention relates to improvements in generators and/or starting motors for motor vehicles.

Heretofore such devices have been connected to the motor by gearing or chain drives, or have been attached co-axially to one end of the crank shaft. However in such constructions there is a great overhanging weight which results in difficulties in securing a proper support of the motor and transmission unit in the frame and its proper location in the vehicle. The reduction in flywheel weight is only small since generators or starters arranged in this way are usually made with rather a small rotor diameter.

It is an object of the present invention to so arrange and dispose the generator and/or starting motor, particularly in relation to the usual clutch mechanism, as to provide for the maximum utilization of the masses in lieu of the usual flywheel.

Another object is to arrange the generator and/or motor parts concentrically around one of the clutch members.

Another object is to provide such a construction in which a single means serves both as a clutch element and a generator or motor element.

Other objects are the provision of simpler and cheaper means for said purposes which may wholly or partly supplant the usual motor flywheel.

Other objects are to provide such a construction in which torsional vibrations are reduced to a minimum.

Another object is to so construct the stator element of the generator or motor that it may serve as the connecting element between the engine block and the usual transmission housing.

Other objects will appear from the following description taken in connection with the attached drawing the single figure of which shows a longitudinal cross-sectional view of an illustrative embodiment of a form of the invention.

In said drawing 1 indicates the crank case, 2 the cylinders in which are located the pistons 3, 4 the usual connecting rods and 5 the crank shaft. The motor block is shown as formed with a ring shaped flange 6. Between this and the flange 7 formed on the transmission housing the stator 8 of a dynamo-electric machine such as the generator or starting motor is located. The stator is shown provided with poles 10 provided with windings 9. The member 11 comprises a combined clutch member and rotor element. In its capacity as rotor element it carries the armature lamina 12 provided with the armature windings 13 which are connected by means of the strips 14 with the appropriate segments of the commutator 15. The members 15 are insulatedly carried upon the forwardly extending flange 16 of the rotor-clutch member 11. Suitable brushes, not shown, cooperate with the commutator. In its capacity as a clutch element, the member 11 is formed as a clutch drum attached to the extension 18 of the crank shaft 3 by any suitable means such as bolts (not shown) extending through the clutch drum flange 17.

The clutch shaft 19 which carries the clutch plate 21 provided with facings 20 is rotatably journaled within the clutch flange 17. The clutch plate 21 is pressed against the clutch drum 11 by means of a plurality of clutch springs 24 shown as located in the housings 23 and acting on clutch ring 22. Suitable means are provided for disengaging the clutch elements such as the clutch ring 25 operating upon clutch levers 26.

The general construction of the generator or starting motor as well as that of the clutch may be of any known or suitable type. It will be seen that by this arrangement the movable part of the clutch is located within and the movable parts of the generator or starting motor are located outside of the rotor which also serves as a clutch drum and that these parts together represent part of the rotating masses of the vehicle motor. The clutch as well as the generator or starting motor lie enclosed within the stator which serves to connect the transmission housing directly with the motor housing.

It will also be noted that since the clutch drum and rotor carrying element, being one member, are attached to the crank shaft at the same point, there is no danger of introducing torsional vibrations which might otherwise occur.

Having described an illustrative embodiment of the invention it is pointed out that various changes and modifications therein may be made without departing from the invention as set forth in the following claims:

What is claimed is:

1. In combination with an engine having a main body portion and an integral annular member extending therefrom, an engine shaft coaxial with said annular extending portion, a cup-shaped flywheel connected for rotation with said shaft, rotor windings of a dynamo electric machine mounted on the periphery of said cup-shaped flywheel, clutch elements mounted in the web of said cup-shaped flywheel, a driven shaft having clutch elements mounted thereon for cooperation with said first clutch elements, an annular ring having the same outer radius of and interengaging with the extending annular portion of said engine body, and stator windings of a dynamo electric machine mounted on the inner surface of said annular ring for cooperation with said rotor windings.

2. The combination according to claim 1 in combination with a gear casing interengaging with and forming an extension of said annular ring.

JOSEF KALES.